United States Patent
Kline et al.

(10) Patent No.: US 10,904,076 B2
(45) Date of Patent: Jan. 26, 2021

(54) DIRECTING FUNCTIONING OF AN OBJECT BASED ON ITS ASSOCIATION TO ANOTHER OBJECT IN AN ENVIRONMENT

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/992,737

(22) Filed: May 30, 2018

(65) Prior Publication Data
US 2019/0372833 A1 Dec. 5, 2019

(51) Int. Cl.
*H04L 12/24* (2006.01)
*G06N 99/00* (2019.01)
(Continued)

(52) U.S. Cl.
CPC ........ *H04L 41/0803* (2013.01); *G06F 16/288* (2019.01); *G06F 16/9554* (2019.01); *G06N 20/00* (2019.01)

(58) Field of Classification Search
CPC ............. H04L 41/0803; H04L 41/5019; H04L 43/0876; G06F 17/30604; G06F 17/30879;
(Continued)

(56) References Cited

U.S. PATENT DOCUMENTS 5,363,297 A * 11/1994 Larson ................. A43B 3/0005
342/126
6,344,794 B1 * 2/2002 Ulrich ................. G06K 17/0022
340/539.16
(Continued)

FOREIGN PATENT DOCUMENTS

CA 2926453 A1 * 4/2015 ............. F24F 11/33
CN 106647301 A * 5/2017
(Continued)

OTHER PUBLICATIONS

Reuters, "Apps that can help you find lost things" [retrieved on May 11, 2018]. Retrieved from Internet URL: <http:/www.deccanchronicle.com/140730/technology-mobiles-and-tabs/article/apps-can-help-you-find-lost-things>, pub. Jul. 30, 2014; Updated Jan. 10, 2016, 6 pgs.
(Continued)

*Primary Examiner* — Kostas J Katsikis
(74) *Attorney, Agent, or Firm* — Tihon Poltavets; Matthew M. Hulihan; Heslin Rothenberg Farley & Mesiti PC

(57) ABSTRACT

Directing functioning of an object based on its association to another object in an environment includes uniquely identifying, and obtaining properties of, each object of a plurality of physical objects in the environment, identifying an improper association between first and second physical objects of the plurality of physical objects in the environment, the improper association being identified based on physical proximity of the first object to the second object, and sending to a mobile device of a user an alert indicating the improper association and prompting the user to direct functioning of the first physical object.

20 Claims, 8 Drawing Sheets

(51) Int. Cl.
  *G06N 20/00* (2019.01)
  *G06F 16/28* (2019.01)
  *G06F 16/955* (2019.01)
(58) Field of Classification Search
  CPC . G06F 16/288; G06F 16/9554; G06N 99/005; G06N 20/00; G06N 5/025; H04W 12/009
  See application file for complete search history.

(56) References Cited

U.S. PATENT DOCUMENTS

| | | | |
|---|---|---|---|
| 7,099,895 B2 | 8/2006 | Dempsey | |
| 7,885,784 B2 | 2/2011 | Frank et al. | |
| 8,616,971 B2* | 12/2013 | Lundback | A63D 15/20 463/31 |
| 8,727,875 B2* | 5/2014 | Lundback | G06K 9/00 463/31 |
| 8,742,927 B2 | 6/2014 | Olivier | |
| 9,142,923 B2* | 9/2015 | McNeely | A61G 7/05 |
| 9,333,649 B1* | 5/2016 | Bradski | B25J 9/1697 |
| 9,375,628 B2 | 6/2016 | DeAngelis et al. | |
| 9,468,850 B2* | 10/2016 | Ibrahim | A63F 13/213 |
| 9,505,494 B1* | 11/2016 | Marlow | B64C 39/024 |
| 9,572,737 B2* | 2/2017 | McNeely | A61G 7/0524 |
| 9,672,726 B2* | 6/2017 | Borke | G16H 40/20 |
| 9,744,457 B2* | 8/2017 | Ibrahim | G06K 9/00724 |
| 9,756,075 B1* | 9/2017 | Gopalakrishna | H04L 63/1491 |
| 9,794,749 B2 | 10/2017 | Kritt et al. | |
| 9,830,424 B2* | 11/2017 | Dixon | G06Q 50/22 |
| 9,898,912 B1* | 2/2018 | Jordan, II | H04L 67/12 |
| 9,925,104 B2* | 3/2018 | McNeely | H01R 13/665 |
| 9,937,090 B2* | 4/2018 | Hayes | G16H 40/20 |
| 9,965,943 B2* | 5/2018 | Borke | G16H 40/20 |
| 10,015,630 B2* | 7/2018 | Reimer | H04W 4/023 |
| 10,019,962 B2* | 7/2018 | Liu | G02B 27/017 |
| 10,055,793 B1* | 8/2018 | Call | G06Q 50/16 |
| 10,102,585 B1* | 10/2018 | Bryant | G06Q 50/16 |
| 10,181,160 B1* | 1/2019 | Hakimi-Boushehri | G06Q 50/16 |
| 10,206,837 B2* | 2/2019 | McNeely | A47C 27/083 |
| 10,242,665 B1* | 3/2019 | Abeloe | G05D 1/0221 |
| 10,282,787 B1* | 5/2019 | Hakimi-Boushehri | G06Q 50/16 |
| 10,290,071 B2* | 5/2019 | Heil | G16H 20/30 |
| 10,304,205 B2* | 5/2019 | Kawabayashi | G06T 7/246 |
| 10,360,787 B2* | 7/2019 | Embree | H04L 67/12 |
| 10,373,261 B1* | 8/2019 | Kellett | G06Q 40/08 |
| 10,390,212 B2* | 8/2019 | Reimer | H04L 51/20 |
| 10,416,275 B2* | 9/2019 | Deangelis | G01S 5/14 |
| 10,474,808 B2* | 11/2019 | Huster | H04L 63/08 |
| 10,509,099 B2* | 12/2019 | Hughes | G01S 5/0289 |
| 10,509,513 B2* | 12/2019 | Sen | G06F 3/0325 |
| 10,514,669 B1* | 12/2019 | Call | G06Q 30/0278 |
| 10,520,582 B2* | 12/2019 | Richley | G01S 5/06 |
| 10,573,146 B1* | 2/2020 | Jordan, II | G06Q 40/08 |
| 10,591,578 B2* | 3/2020 | O'Hagan | G01S 5/0205 |
| 10,688,662 B2* | 6/2020 | Hager, IV | B25J 9/1664 |
| 2001/0000958 A1* | 5/2001 | Ulrich | G06K 17/0022 340/539.13 |
| 2002/0094012 A1* | 7/2002 | Belcher | G01S 13/878 375/130 |
| 2002/0097182 A1* | 7/2002 | Goren | H04L 1/1685 342/357.4 |
| 2002/0103674 A1* | 8/2002 | Reeder | G06F 19/3418 705/3 |
| 2003/0030569 A1* | 2/2003 | Ulrich | G06K 17/0022 340/8.1 |
| 2003/0179294 A1* | 9/2003 | Martins | G06K 9/32 348/157 |
| 2004/0143459 A1* | 7/2004 | Engleson | G06F 19/3468 705/2 |
| 2005/0117778 A1* | 6/2005 | Crabtree | G06T 7/70 382/103 |
| 2005/0270156 A1* | 12/2005 | Ravet | A63B 24/0021 340/572.1 |
| 2007/0194922 A1 | 8/2007 | Nathan et al. | |
| 2007/0204691 A1 | 9/2007 | Bogner et al. | |
| 2007/0211919 A1* | 9/2007 | Nagaoka | G06K 9/00805 382/104 |
| 2008/0267451 A1* | 10/2008 | Karazi | G06K 9/00771 382/103 |
| 2009/0231198 A1* | 9/2009 | Walsh | A63B 71/06 342/463 |
| 2010/0026809 A1* | 2/2010 | Curry | H04N 5/23238 348/157 |
| 2011/0054782 A1* | 3/2011 | Kaahui | A63B 69/3608 701/532 |
| 2012/0065483 A1* | 3/2012 | Chung | A01K 11/006 600/310 |
| 2013/0285837 A1* | 10/2013 | Uchida | H04L 12/2825 340/870.02 |
| 2014/0132409 A1* | 5/2014 | Billman | G08B 31/00 340/539.1 |
| 2014/0257862 A1* | 9/2014 | Billman | G06Q 50/163 705/4 |
| 2014/0266669 A1* | 9/2014 | Fadell | G06N 5/04 340/501 |
| 2015/0154712 A1* | 6/2015 | Cook | G06Q 40/08 705/4 |
| 2015/0163412 A1* | 6/2015 | Holley | G08B 19/00 348/143 |
| 2015/0364028 A1* | 12/2015 | Child | G08B 1/08 348/143 |
| 2016/0025615 A1* | 1/2016 | Fishel | G01N 19/00 702/33 |
| 2016/0078744 A1* | 3/2016 | Gieck | G08B 17/113 340/585 |
| 2016/0171896 A1* | 6/2016 | Buchmueller | G05D 1/0088 701/3 |
| 2016/0247405 A1* | 8/2016 | Paczan | G08G 5/0069 |
| 2016/0247407 A1* | 8/2016 | Paczan | G01S 5/16 |
| 2017/0154302 A1* | 6/2017 | Streebin | G06T 7/521 |
| 2018/0088323 A1* | 3/2018 | Bao | G02B 27/0093 |
| 2018/0139565 A1* | 5/2018 | Norris | H04S 7/304 |
| 2018/0322348 A1* | 11/2018 | Sweet, III | G01S 17/933 |
| 2018/0357760 A1* | 12/2018 | Wang | G06K 9/00348 |
| 2018/0374264 A1* | 12/2018 | Gatson | G01S 15/87 |
| 2019/0372833 A1* | 12/2019 | Kline | H04L 41/0803 |

FOREIGN PATENT DOCUMENTS

| | | |
|---|---|---|
| CN | 106014075 B | * 10/2017 |
| CN | 107247415 A | * 10/2017 |
| CN | 107306212 A | * 10/2017 |

OTHER PUBLICATIONS

"TrackR Lost Item Tracker" [retrieved on May 11, 2018]. Retrieved from Internet URL: <https://play.google.com/store/apps/details?id=com.phonehalo.itemtracker&hl=en>, 4 pgs.

"TrackR | Find lost keys, wallets, phones and more with TrackR pixel" [retrieved on May 11, 2018]. Retrieved from Internet URL: <https://www.thetrackr.com/>, 11 pgs.

Luimula, M., et al., "Remote navigation of a mobile robot in an RFID-augmented environment," Personal and Ubiquitous Computing archive, vol. 14 Issue 2, Feb. 2010, pp. 125-136.

Shabib, N., et al., "Product-aware advertising," EATIS '12 Proceedings of the 6th Euro American Conference on Telematics and Information Systems, May 23-25, 2012 Valencia, Spain, pp. 355-358.

Wang, J., et al., "Dude, where's my card?: RFID positioning that works with multipath and non-line of sight," SIGCOMM'13, Aug. 12-16, 2013, Hong Kong, China, pp. 51-62.

Shangguan, L., et al., "STPP: Spatial-Temporal Phase Profiling-Based Method for Relative RFID Tag Localization," IEEE/ACM Transactions on Networking (TON) archive, vol. 25 Issue 1, Feb. 2017, pp. 596-609.

(56) References Cited

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

DIRECTING FUNCTIONING OF AN OBJECT BASED ON ITS ASSOCIATION TO ANOTHER OBJECT IN AN ENVIRONMENT

BACKGROUND

When dealing with various home/domestic appliances, internet or network-connected devices, or other physical objects, there may be associations between two or more of these objects that are improper, for instance because of the possibility of an accident or damage to one or more of the objects. As an example, an electronic children's toy left in a dishwasher may become damaged if the dishwasher is run with the toy inside. The dishwasher itself could also be damaged. In this situation, an association between the toy and the dishwasher—the physical location of the toy relative to (inside of) the dishwasher—is improper because it may result in damage to one or both devices. Many other associations between physical objects, for instance electronic devices including smart appliances, computer systems, and other network-connected devices, may be deemed improper for any of various reasons.

SUMMARY

Existing approaches fail to track associations between physical objects, including those that are improper due to the risk of damage or loss, while helping users to address these associations as necessary. Shortcomings of the prior art are overcome and additional advantages are provided through the provision of a computer-implemented method. The method uniquely identifies, and obtains properties of, each object of a plurality of physical objects in the environment. The method identifies an improper association between first and second physical objects of the plurality of physical objects in the environment, the improper association being identified based on physical proximity of the first object to the second object. The method sends to a mobile device of a user an alert indicating the improper association and prompts the user to direct functioning of the first physical object.

Further, a computer program product including a computer readable storage medium readable by a processing circuit and storing instructions for execution by the processing circuit is provided for performing a method. The method uniquely identifies, and obtains properties of, each object of a plurality of physical objects in the environment. The method identifies an improper association between first and second physical objects of the plurality of physical objects in the environment, the improper association being identified based on physical proximity of the first object to the second object. The method sends to a mobile device of a user an alert indicating the improper association and prompts the user to direct functioning of the first physical object.

Yet further, a computer system is provided that includes a memory and a processor in communication with the memory, wherein the computer system is configured to perform a method. The method uniquely identifies, and obtains properties of, each object of a plurality of physical objects in the environment. The method identifies an improper association between first and second physical objects of the plurality of physical objects in the environment, the improper association being identified based on physical proximity of the first object to the second object. The method sends to a mobile device of a user an alert indicating the improper association and prompts the user to direct functioning of the first physical object.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
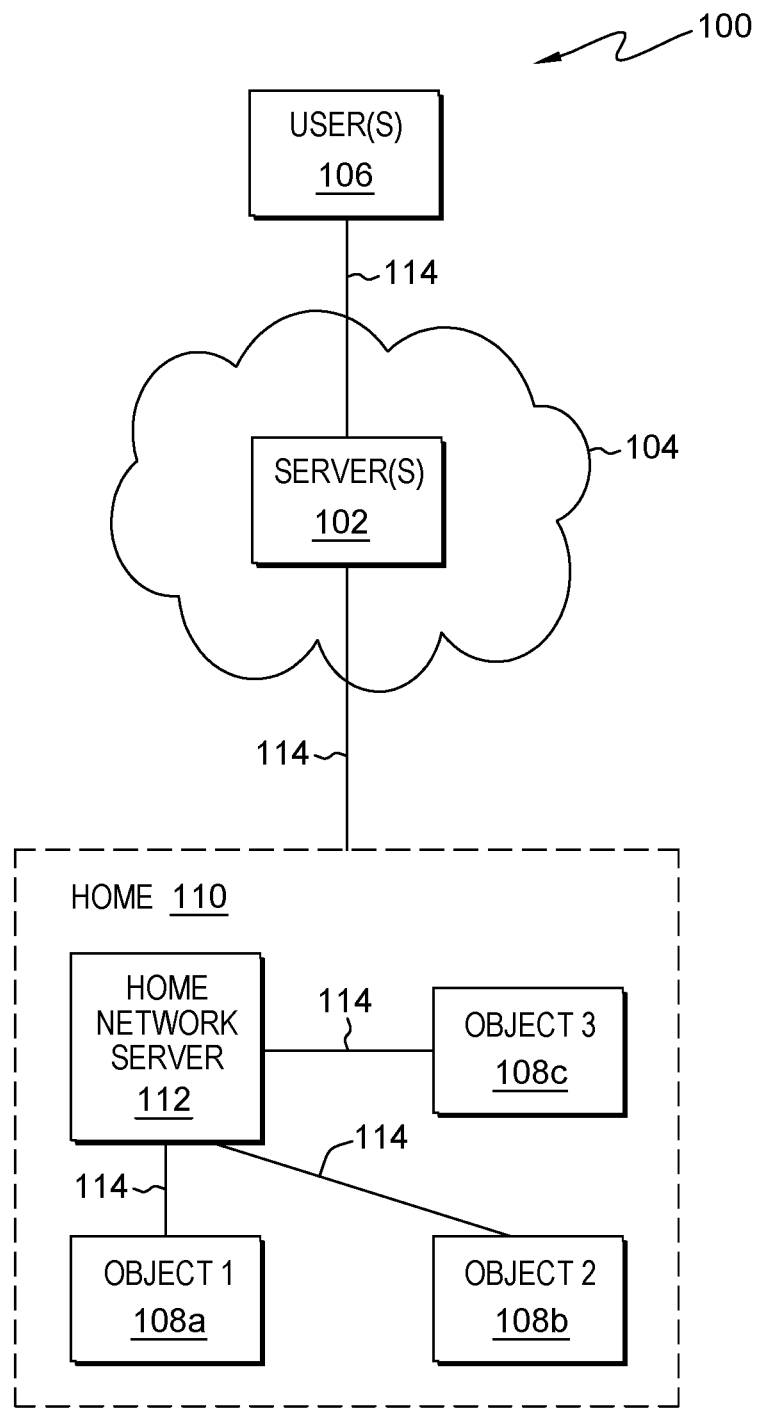
FIG. 1 depicts an example environment to incorporate and use aspects described herein.

Described herein are aspects that recognize improper associations between objects, communicate these improper associations to users, and receive direction on how these objects are to function in light of the improper associations. By improper is meant undesired, inappropriate, and/or with the potential of physical damage to one or both of the objects. Improper associations between objects may be identified and a user alerted to them, for instance by way of a software application ("app") installed on the user's mobile device. Using the mobile device, the user can approve or reject the association. Approval indicates that the user currently approves of the association, in which case functioning (perhaps regular or normal functioning) of one or more of the objects will, as one example, continue or resume as if the association were never deemed improper. A user's rejection or denial of an association can cause function(s) of one or both device to cease, lock, change, refrain from being performed, or the like, for instance until the association changes and/or is no longer deemed improper. In particular examples, once an improper association is identified, an alert is automatically communicated to the user, and the user is prompted to take corrective action before one or more of the involved objects performs an activity. By way of example, an improper association may be identified based on recognizing that a child's toy is physically present inside of a smart (i.e. internet or network-connected) washing machine. The association may (at least initially) be deemed improper on the basis that running the toy though a washing machine cycle could damage the toy and/or the washing machine. Functioning of the washing machine, for instance running a cycle, may be halted or disabled temporarily until the association changes to something that is no longer improper, for instance the toy is removed from the washing machine or the association is approved (e.g. no longer deemed improper, or considered an exception). A user, such as the owner of the involved objects, is alerted to the association and has the ability to approve or deny/reject the association. An example in which approval may be appropriate is when the toy (e.g. a stuffed animal) is purposely placed in the washing machine to be washed. An example when the association may be rejected (i.e. confirmed by the user to be improper) is when the toy is an electronic device that would be permanently destroyed if run through a washing machine cycle.

In an additional aspect described herein, processes can leverage augmented reality to display/visualize all identified improper associations in an environment, for instance the user's home, and accordingly enable the user to correct these associations if desired.

In yet further aspects described herein, a self-learning process can track a user's approval or rejection of various inappropriate associations and learn the user's behavior with respect to improper associations (e.g. which are likely to be approved and which are likely to be rejected). Based on this, rule(s) on what types of associations are rightfully deemed improper for this user and/or rule(s) dictating when to notify a user about an identified association may be built or modified.

Physical objects can be any type of physical object. In particular examples, physical objects are electronic devices (domestic appliances, computer systems including mobile devices, internet or network-connected "smart" devices, etc.). For instance, an object may be a connected domestic appliance, such as a dishwasher, refrigerator, washing machine, etc., or a component of such a connected device.

Electronic devices may become connected to a user's home network, or wirelessly communicate with (e.g. send data to) a device on the user's home network. In some examples, network-connected sensor devices (which themselves are objects) are affixed to other objects (such as a carton of milk) and may monitor properties of that object, such as the volume or level of milk left in the container or the temperature of the milk.

In examples presented herein, the subject location in which the objects reside is a user's home, though it should be understood that this is by way of example only. FIG. 1 depicts an example environment 100 to incorporate and use aspects described herein. Environment 100 includes a facility (in this example server(s) 102) providing coordination for the handling of associations as described herein. The server(s) 102 are hosted in a cloud environment 104. Users 106 communicate with server(s) 102 via computer systems represented by 106 that connect to the internet to access the servers. As an example, users 106 use computer devices of the environment that interact with the server(s) 102, for instance to receive alerts about associations between objects and direct functioning of the objects as desired. For instance, the users 106 utilize an app installed on their mobile device that connects to server(s) 102.

Also included in the environment are a plurality of physical objects (108a, 108b, 108c) present at location 110, in this example a user's home environment. Objects 108a, 108b, 108c can also communicate with other devices, such as the server(s) 102. In this example, the communication between the objects and the server(s) is made via a home network server 112 to which each object 108a, 108b, 108c connects, and which communicates with the server(s) 102. An example home network server is a smart hub device that connecters wired or wirelessly to the user's home router or modem for internet access to communicate with the server(s) 102. In other examples, the home network server may be an edge appliance of the network. Additionally or alternatively, one or more of objects 108a, 108b, 108c connect directly to the internet in order communicate with server(s) 102.

In the example of FIG. 1, each object 108a, 108b, 108c is in data communication (wired or wireless) with home network server 112, though in other examples, some objects may not be "smart" insofar as they may not be in data communication with any external device. For instance, a carton of milk may not include any circuitry. Nevertheless, other devices, such as cameras, may be able to recognize the carton of milk in images acquired from the location 110, in order to identify the location of the milk, for instance. Alternatively, the carton of milk or other object may have some short or near-range technology component, such as a radio-frequency identification (RFID) tag or other transmitter, affixed or embedded with it, in which case it communicates with other devices (such as an RFID reader), and not directly with the home network server 112.

Thus, some components in FIG. 1 form wired or wireless network(s), and communication between the devices takes place via wired or wireless communications links 114 for communicating data between the devices. FIG. 1 is just one example of an environment to incorporate and use aspects described herein.

According to aspects described herein, software of server(s) 102 can perform processes for handling associations between objects in location/environment 110. Sever(s) can identify the objects in/at the location 110 and gather properties about those objects (for instance via the home network server 112), consult literature about the objects, for instance user manuals, guides, specifications, or the like about the objects. The server(s) could identify associations between objects, and more specifically identify those associations that are considered improper based on a rule, specification, or the like dictating what is improper. In this regard, a rule may be defined (manually by administrators or individual users, or automatically) that dictates what constitutes an improper association between subject objects and/or when to notify a user about an improper association between subject objects. In this latter scenario, associations that are questionably improper or which the system anticipates (perhaps based on prior user behavior) the user will approve, the rule can detail when the notification can be skipped and perhaps automatically approved.

Server(s) 102 can communicate with user devices 106 to, for example to provide alerts indicating improper associations and receive user directives in response. The server(s) can also push data, commands, responses, instructions, etc. down to the objects themselves (perhaps directly over the internet and/or through the home network server 112). For instance, pushed instructions may include instructions that direct the functioning of objects, for instance to control activities or other functions performed by smart devices, like connected domestic appliances. Server(s) 102, user devices 106, home network server 112 and/or other computer systems can perform other aspects described elsewhere herein. Users may also be able to interact with the home network server 112 or an individual object through the server(s) 102 and/or via text-based communication in order to direct functioning of objects.

Using proximity sensors, RFID data, image recognition, and/or other technology, physical objects in an environment (e.g. a user's house) are identified, for instance by the home network server or hosted server(s) 102. The objects may be uniquely identified and properties of each object may be obtained. Some properties may be obtained from the object itself, for instance parameters or other properties that the object communicates to external devices. Alternatively, some properties may be obtained not from the device per se but from elsewhere. The location of the object may be obtained by analyzing images of the environment to identify the location, for example. Other properties may be harvested from internet-sourced information, such as product manuals, user guides, other manufacturer-provided information, or the like. An example property of an object may be an operating temperature range for the object objected from a product specification or user manual.

Uniquely identifying an object could include wirelessly obtaining an identifier from the object (e.g. a model number sent by the object) or from a radio-frequency identification tag coupled to the object, as examples.

In any case, identifying the physical objects enables identification of improper association(s) that may exist between some of those devices. An improper association is identified between first and second physical objects in the environment, for instance. In some examples, the improper association is identified based on physical proximity of the first object to the second object. For instance, a smartphone being located within a dishwasher may be identified as an improper association on the basis that, typically, smartphones are not washed in a dishwasher as it could damage either or both devices. Proximity of one device to another object, and more specifically their location relative to each other, could be determined based on proximity sensor(s), radio frequency identification, and/or images of the environment, as examples.

In some embodiments, compatibility (or lack thereof) between objects serves as a basis for determining whether an association between them is improper. Compatibility between objects may be identified based on any of a variety of information. The obtained properties of the objects might inform compatibility issues, for instance.

Figure 2:
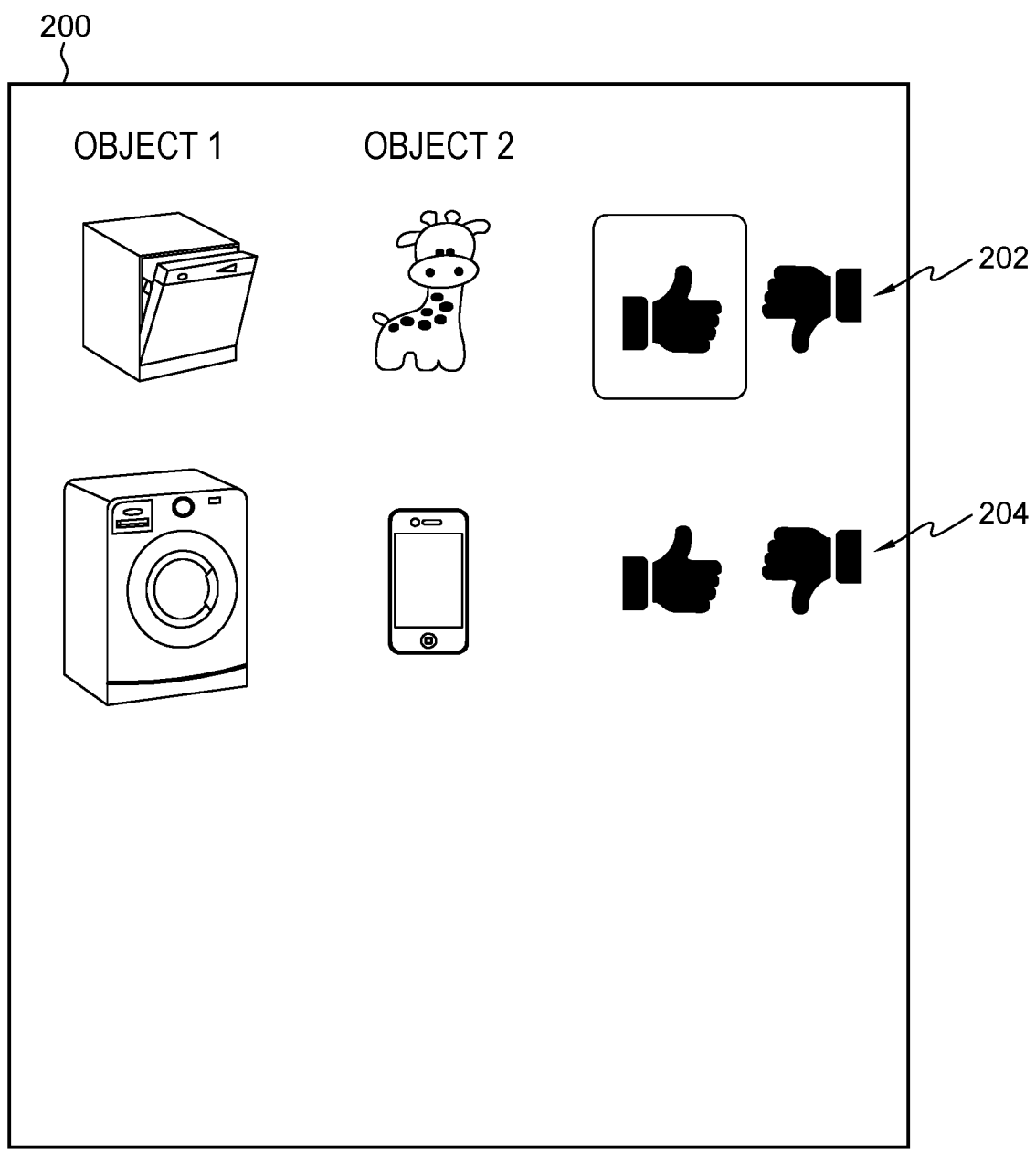
FIG. 2 depicts an example graphical interface for alerting a user to improper associations between physical objects and prompting the user for approval/denial of those associations, in accordance with aspects described herein.

FIG. 2 depicts an example graphical interface for alerting a user to improper associations between physical objects and prompting the user for approval/denial of those associations, in accordance with aspects described herein. In the example of FIG. 2, two improper associations have been communicated as notifications 202 and 204 to the user's mobile device. FIG. 2 shows the interface 200 provided by an app installed on the user's mobile device.

The server(s) (FIG. 2, 102), for instance, send to the mobile device of the user alert(s) indicating improper association(s) and prompt for the user to direct functioning of one or more of the involved physical objects. In this manner, the user can take action on the notifications, for instance to approve or reject the notification/association.

Specifically in FIG. 2, notification 202 shows an improper association between a dishwasher (Object 1) and plastic toy animal (Object 2). The association was deemed improper by a system on the basis that a toy is usually not washed in the dishwasher. The user is given options of approving the association (thumbs up) or rejecting the association (thumbs down). Here, the user has at some point accepted the association by selecting the thumbs up button (shown highlighted in FIG. 2). The user evaluated the association and decided the toy was intentionally placed into the dishwasher in order to wash the toy. In some examples, the approval by way of the 'thumbs up' icon will automatically cause signals, commands, data, etc. to be sent to the dishwasher and/or toy in order to direct its functioning. As one example, a command to proceed with a wash cycle despite the toy being present may be sent. Additionally or alternatively, the user may be presented with a selection interface indicating potential functions that may be invoked on/by the dishwasher, toy, or both. The user could select one or more of those functions.

Alternatively, the system may have automatically (via product documentation for the toy) ascertained that this particular toy is designed to be cleaned in the dishwasher and may be automatically (perhaps based on learning user behavior as described below) accept the association, in this example. In other examples, the system may have refrained from deeming the association improper in the first place, on the basis of finding this information in the product documentation before or while the system assesses whether the association is improper.

Based on the accepted association 202, functioning of the dishwasher may be directed accordingly. For instance, the dishwasher may run its next scheduled cycle even if the toy remains within the dishwasher. Alternatively, the ability for another user to invoke a wash cycle on the dishwasher may be unlocked on the basis that the association has since been approved by the user, after having been initially locked when it determined the improper association.

Association 204 indicates an improper association between a washing machine (Object 1) and smartphone (Object 2) in the washing machine. The smartphone may be left in the pocket of the user's pants, for instance. The user has not indicated whether this improper association is approved or rejected. In all likelihood, the user will reject this association because subjecting a smartphone to a wash cycle would almost always be damaging to the device, and therefore undesired.

Thus, the notifications 202, 204 can serve as prompts to the user to direct functioning of one or both objects by approving or denying the association and optionally selecting specific function(s) for those devices to perform. An approval or denial of an association can be received from the user, based on the prompting, by, e.g. a server 102 and/or home network server 112 and direct functioning of object(s) in the environment 110. For instance, based on the user approving an improper association, this might initiate commencement of a function of an object (e.g. a smart device will start working). Based on the user rejecting the improper association, function(s) of object(s) may be at least temporarily blocked, stopped, disabled, locked, or the like, for instance until the association between the first physical object and second physical object is no longer deemed improper. The association may no longer be deemed improper based on some correction applied to one or more object(s) (e.g. changing their location, such as removing one object from the other). Alternatively, the association may no longer be deemed improper if the user goes navigates into the app and changes an association from being rejected to being accepted.

Another example of an improper association is when objects are apart but should not be, for instance when a user leaves a half-empty carton of milk on the kitchen counter and leaves the house to go to work. It may be undesired to leave a carton of milk out all day at room temperature. The location of the milk relative to the refrigerator may be determined using proximity sensors, RFID, camera image recognition, or any other approach and technology, and ascertain that the milk is not located in the refrigerator. This information, optionally combined with information conveying that the user left for work (for instance as conveyed by user mobile device location(s)), could identify an improper association in that the milk is supposed to have been placed back into the refrigerator but it has not. Relatively close proximity between the refrigerator and milk is expected in this example but is not present, and therefore an alert may be raised to the user. In this particular example, a notification could be automatically sent to a device within the home, such as the mobile device of another user located in the home or a smart speaker device for broadcasting an alert or notification in the home to alert another user to place the milk into the refrigerator.

In some embodiments, user approvals and rejections of identified improper associations between physical objects are tracked (logged, stored, or the like) and machine learning is applied to the tracked user approvals and rejections to build and train a model of how the user approves or rejects improper associations (i.e. to classify the user's selections with respect to the associations). Rule(s) defining, as examples, (i) what constitutes an improper association between subject objects and/or (ii) when to notify a user about an improper association between subject objects, can be modified based on the learning that is performed over time. In a particular example, if the same association between the same two objects regularly occurs and is approved by the user, a rule may be created, modified, or deleted on the basis of the user's repeated acceptance of the association. For instance, a rule is created to indicate the association is proper (or refrain from notifying the user that it is improper and automatically accepting it). As another example, a rule defining the association to be improper may be tweaked to add this object-pair as an exception.

Figure 3:
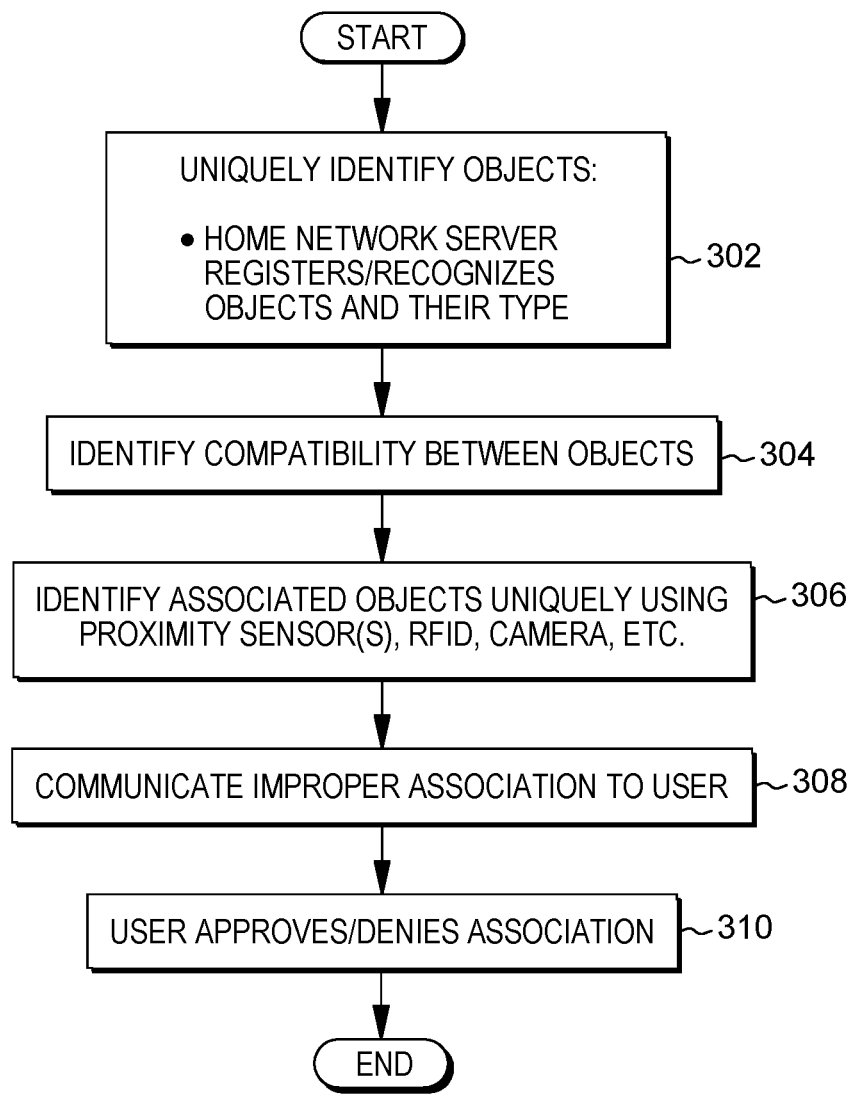
FIG. 3 depicts an example process for identifying and handling associations between physical objects, in accordance with aspects described herein.

Accordingly, FIG. 3 depicts an example process for identifying and handling associations between physical objects, in accordance with aspects described herein. The process could be performed by one or more computer systems, for instance one or more of: server(s) 102, home network device 112, and/or any other computer systems.

The process uniquely identifies each device/physical object of several within the home (302). For instance, the home network server recognizes/registers objects by their type(s). In some embodiments, this recognition is done automatically and triggered when the object is introduced into the environment, for instance it is brought into the home. Recognition of object type can include recognizing properties of its construction (glass item, steel item, metal toy, electronic device, mobile device) and other properties related to it functioning (for instance that internal components rotate, it gets wet, hot, etc.—as is the case with dishwashers, mixers, washing machines, dryers, heaters, etc.). In some examples, RFID tags are used for unique identification of objects, and may also be used to locate the objects in the environment. In some examples, types, models, brands, and other information about objects are identified from data received from the object or an RFID tag attached thereto, or based on image recognition that recognizes the objects, as examples. Example objects include, but are not limited to, clothing, kitchen appliances and utensils, electronic devices, and toys.

The process identifies compatibility between objects (304), for instance per specifications of object manufacturers. For example, a mobile phone is not compatible with a clothes-washing machine, a plastic toy is not compatible with a dishwasher, glass items are not compatible with gas burners and sharp or pointy objects, such as corners of a table, as examples.

The process identifies unique associations between objects, for instance by analyzing proximity sensor(s), RFID data, and/or camera feeds when any two physical objects are associated with each other (306). Any improper association is then communicated to the user (308), which the user can visualize on the user's mobile device. In FIG. 2, this is visualized in an app. Additionally or alternatively, this is done via augmented reality overlays as described herein. Accordingly, the user can approve or reject the association (310).

As noted, a process may, in some embodiments, leverage augmented reality (AR) technology to convey improper associations to users. For example, a user in the environment could wear a head-mounted wearable mobile device, such as is depicted and described with reference to FIG. 5, having a transparent display on which graphical elements are drawn and interposed in the line of sight of the user through the transparent display to the environment. The AR elements could be any graphical elements, such as markers, highlights, animations, flashes, shapes, or any other elements that appear to users viewing that environment through a head-mounted wearable device (as one example). Other example devices with augmented reality capabilities include other types of mobile devices, such as smartphones and tablets, where a user leverages a camera of the mobile device to capture/show a scene of an environment on the device display and the device draws graphical AR elements on the device's display, giving an impression that the AR objects exist in the real-world physical environment, for instance. Accordingly, processes can provide, for each improper association of one or more improper associations between respective pairs of physical objects in the environment, and in conjunction with the user's view, in or through the display, an augmented reality graphical overlay, on the display of the mobile device. The graphical overlay can highlight or otherwise indicate the association and/or one or both objects of the pair of physical objects of the improper association.

Figure 4:
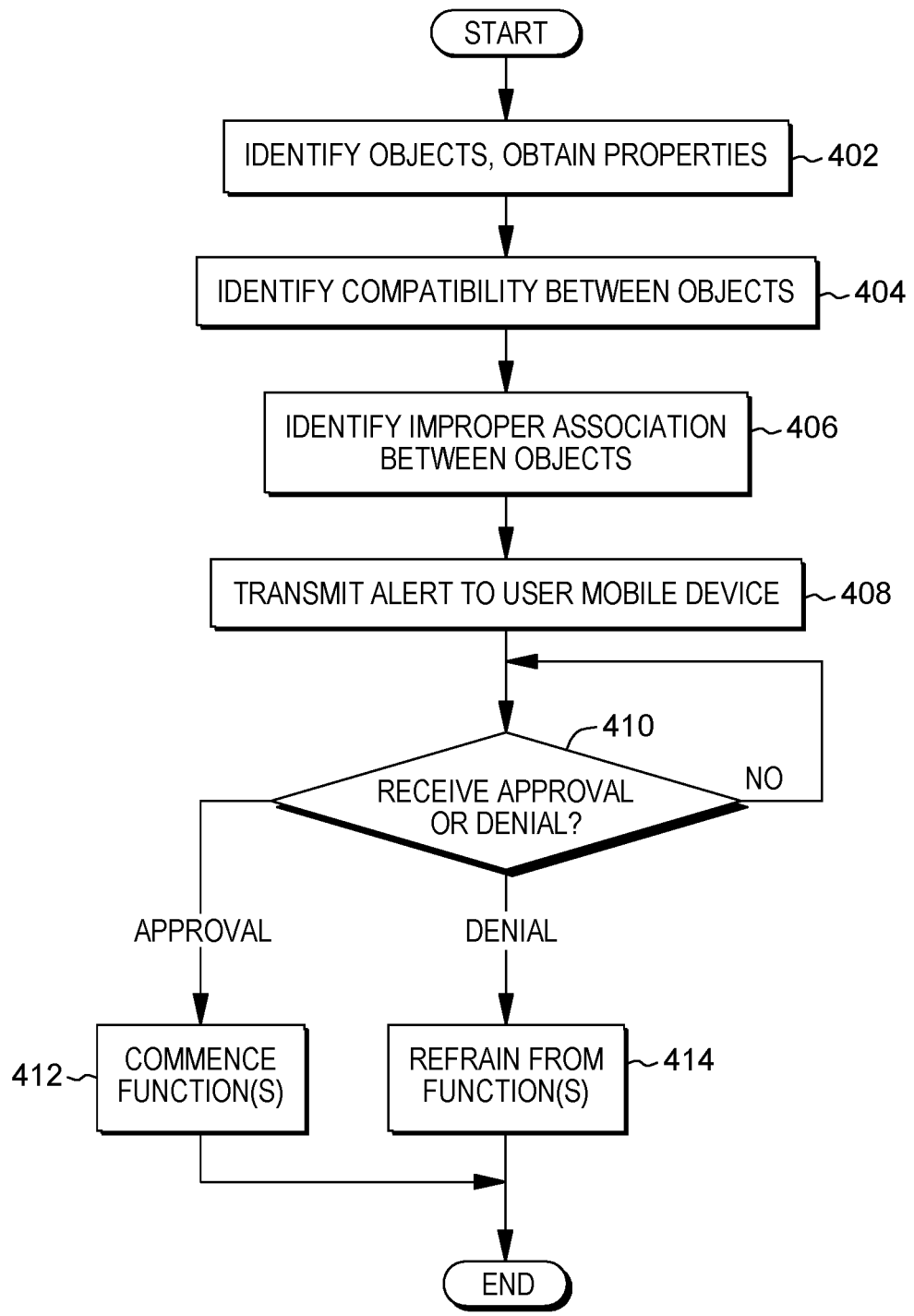
FIG. 4 depicts an example process for handling an improper association between physical objects in an environment, and directing functioning based thereon, in accordance with aspects described herein.

FIG. 4 depicts an example process for handling an improper association between physical objects in an environment, and directing functioning based thereon, in accordance with aspects described herein. In some examples, the process is performed by one or more computer systems, such as those described herein, which may include one or more computer systems of or connected to a home computer network, such as a home network server, server(s) connected thereto, individual user devices, and/or one or more other computer systems. The process uniquely identifies objects and obtains properties of each object of a plurality of physical objects in an environment (402). Uniquely identifying an object can include, as one example, wirelessly obtaining an identifier from the object or from a radio-frequency identification tag coupled to the object.

The process identifies compatibility between first and second physical objects of the plurality of objects (404) based on the obtained properties about the first and/or second physical objects. The compatibility can indicate that the association between the first and second physical objects is improper. In some examples, the properties about the first and/or second physical objects are obtained from manufacturer-provided information about the first and/or second physical objects.

Example physical objects include electronic devices, such as domestic appliances, computer systems, such as mobile devices, internet-connected devices, network-connected devices, and others.

The process identifies an improper association between the first physical object and second physical object in the environment (406). The improper association between the first and second physical objects can be based on their proximity to each other, as one example, which includes where one object is in relation to the other object.

In some examples determining the proximity of the first object to the second object is based on: (i) one or more proximity sensors, (ii) radio frequency identification, and/or (iii) one or more images of the environment. For instance, images can be analyzed to identify locations of objects in the images.

An improper association between the first and second physical objects may be identified based on a potential for damage to the first object, which may be informed based on the identified compatibilities of the objects. For instance, a plastic object may not be compatible with extreme heat, or electronic devices may not be compatible with water.

Continuing with FIG. 4, the process sends to a mobile device of a user an alert indicating the improper association and prompting the user to direct functioning of the first and/or second physical objects (408). The functioning may be implied based on the user's approval or rejection of the association. Additionally or alternatively, the user is presented with options for directing the functioning of the objects, for instance options for how an object is to perform, or what specific function it performs. This may be controlled via an intermediate device, such as a home network server, though this is not required. A determination is made as to whether an approval or denial of the association has been received (410). The approval or denial directs functioning of the first and/or second physical objects. If neither has been received (410, No), the process loops, for instance to keep the status quo of the object(s) functions. The status quo may be, for instance, that functioning was halted or restricted upon initially identifying the association (406). If at 410 it is determined that an approval was received, the process commences or initiates commencement of (e.g. by sending a signal) function(s) of the first and/or second physical objects. Otherwise, if at 410 it is determined based on user input that the user rejects the improper association, the process proceeds by restricting (e.g. temporarily blocking) function(s) of the object(s). For instance, function(s) are at least temporarily blocked until the association between the objects is no longer deemed improper (either by the user later approving the association, or by correcting the association by changing a state (e.g. location) of one or both objects.

In some embodiments, the process tracks user approvals and rejections of prior-identified improper associations between physical objects, applies machine learning to the tracked user approvals and rejections to model how the user approves or rejects improper associations and modifies at least one rule defining, as examples (i) what constitutes an improper association between subject objects, and/or (ii) when to notify a user about an improper association between subject objects.

Additionally or alternatively, the process provides, for each improper association of one or more improper associations between respective pairs of physical objects in the environment, the one or more improper associations including the identified improper association between the first physical object and second physical object from FIG. 4, an augmented reality graphical overlay on a display of the mobile device in conjunction with a view, in or through the display, of one or both objects of the pair physical objects of the improper association.

Although various examples are provided, variations are possible without departing from a spirit of the claimed aspects.

Figure 5:
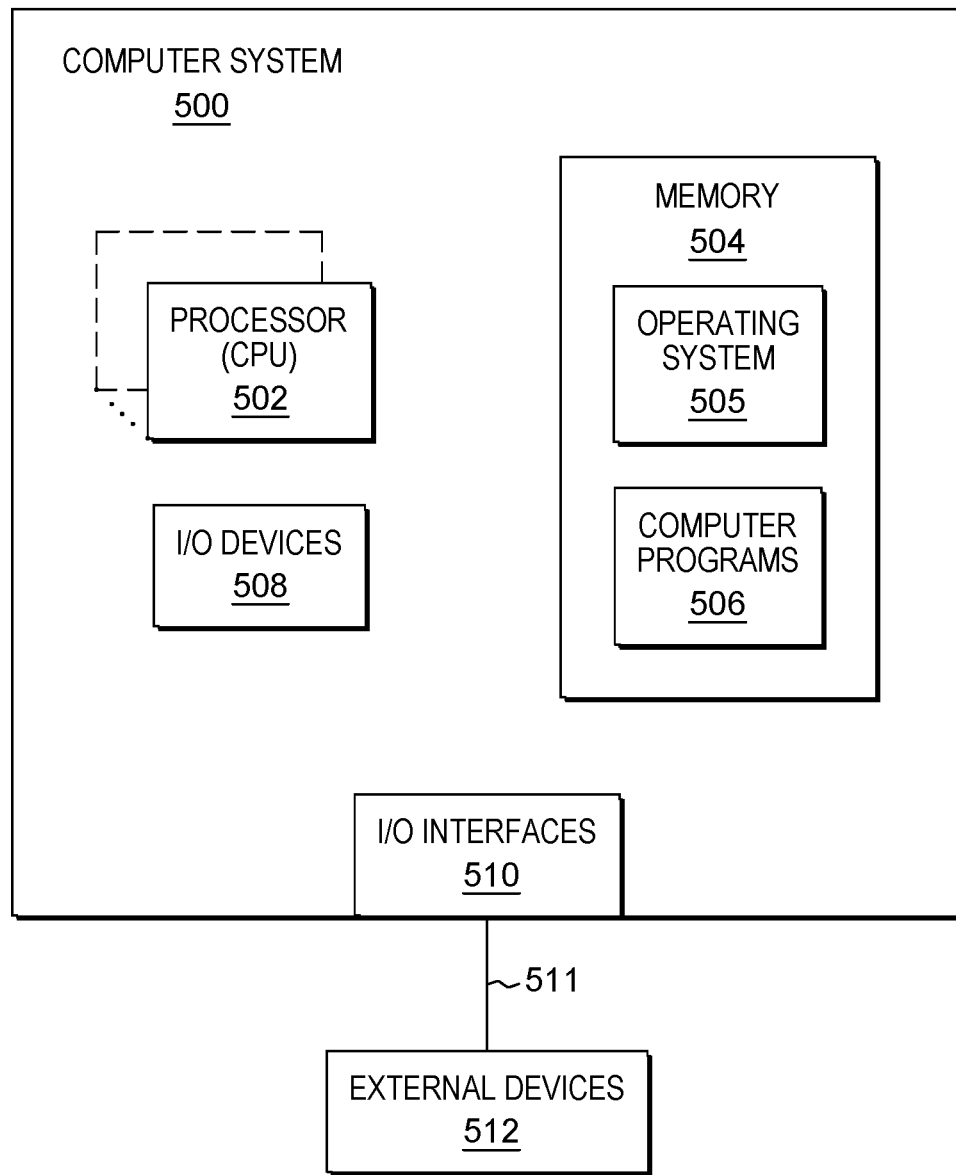
FIG. 5 depicts one example of a computer system and associated devices to incorporate and/or use aspects described herein.

Processes described herein may be performed singly or collectively by one or more computer systems, such as one or more servers, user devices, or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Figure 6:
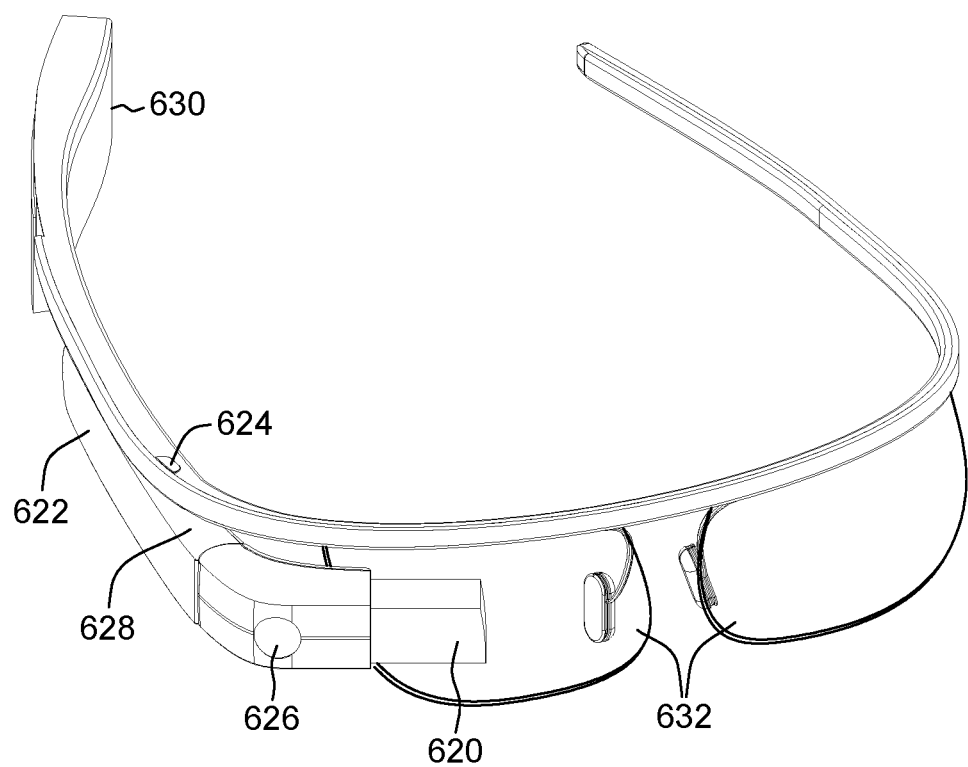
FIG. 6. depicts one example of a head-mounted wearable mobile device in accordance with aspects described herein.

FIG. 6 depicts another example of a computer system to incorporate and use aspects described herein. FIG. 6 depicts an example head-mounted eyewear based wearable device, which may include many of the same types of components included in computer system 500 described above. In the example of FIG. 6, the device is configured to be wearable on the head of the device user. The device includes a display 620 that is positioned in a vision line of sight of the user when the device is in operative position on the user's head. Suitable displays can utilize LCD, CRT, or OLED display technologies, as examples. Lenses 632 may optionally include active translucent displays, in which an inner and/or outer surface of the lenses are capable of displaying images and other content, for instance augmented reality content. This provides the ability to impose this content directly into the line of sight of the user, overlaying at least part of the user's view to the environment through the lenses. In particular embodiments described herein, content presented on the lens displays include transparent AR graphical elements.

The device of FIG. 6 also includes touch input portion 622 that enable users to input touch-gestures in order to control functions of the device. Such gestures can be interpreted as commands, for instance a command to take a picture, a command to launch a particular service or application, or a command to build/place AR objects. The device also includes button 624 in order to control function(s) of the device. Example functions include locking, shutting down, or placing the device into a standby or sleep mode.

Various other input devices are provided, such as camera 626, which can be used to capture images and/or video. The camera can also be used by the device to obtain an image of the user's view of his or her environment to use in, for instance, capturing images/videos of a scene. One or more microphones, proximity sensors, light sensors, accelerometers, speakers, GPS devices, and/or other input devices (not labeled) may be additionally provided, for instance within housing 628. Housing 628 can also include other electronic components, such as electronic circuitry, including processor(s), memory, and/or communications devices, such as cellular, short-range wireless (e.g. Bluetooth), or WiFi circuitry for connection to remote devices. Housing 628 can further include a power source, such as a battery to power components of the device. Additionally or alternatively, any such circuitry or battery can be included in enlarged end 630, which may be enlarged to accommodate such components. Enlarged end 630, or any other portion of the device, can also include physical port(s) (not pictured) used to connect the device to a power source to recharge a battery and/or any other external device, such as a computer. Such physical ports can be of any standardized or proprietary type, such as Universal Serial Bus (USB).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
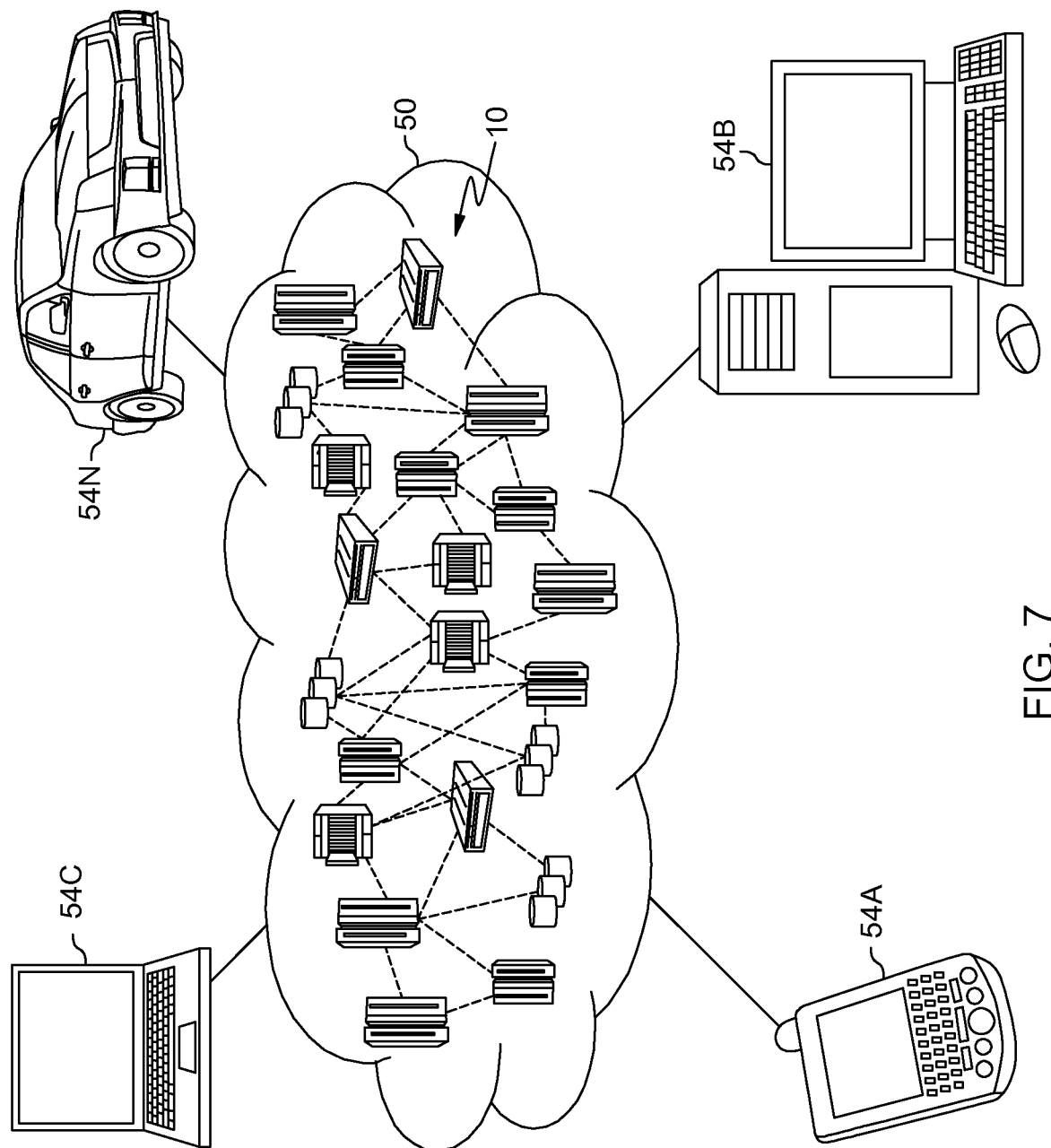
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
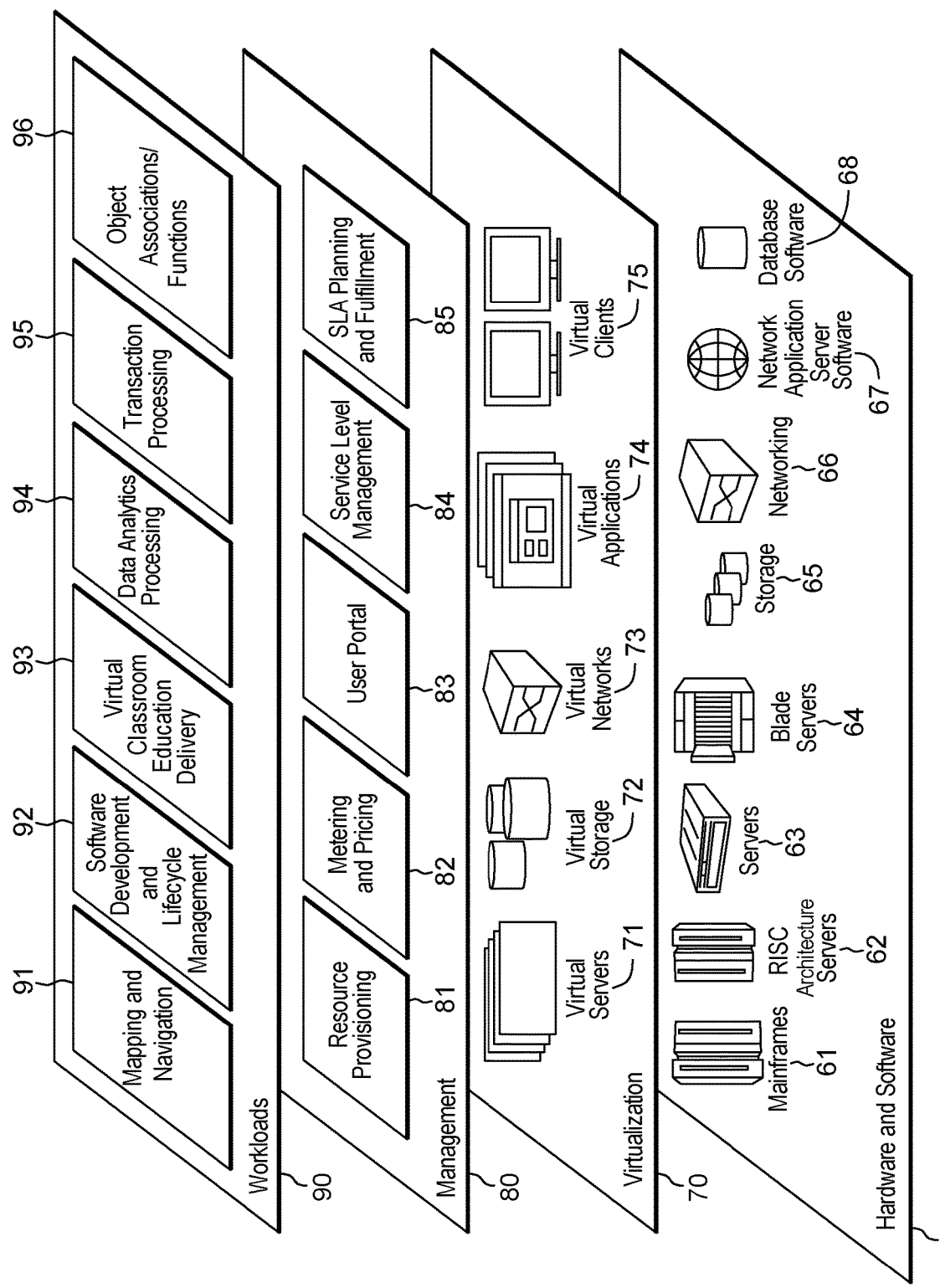
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object association/functioning 96, related to directing functioning of an object based on its association to another object in an environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
uniquely identifying, and obtaining properties of, each object of a plurality of physical objects in an environment;
identifying an improper association between first and second physical objects of the plurality of physical objects in the environment, the improper association being identified based on physical proximity of the first object to the second object and further using obtained properties of the first and second physical objects in identifying compatibility between the first and second physical object and informing that the association between the first and second physical objects is improper; and
sending to a mobile device of a user an alert indicating the improper association and prompting the user to direct functioning of the first physical object and allay an anticipated consequence of the improper association between the first physical object and the second physical object.

2. The method of claim 1, wherein uniquely identifying an object of the plurality of objects comprises wirelessly obtaining an identifier from the object or from a radio-frequency identification tag coupled to the object.

3. The method of claim 1, wherein the improper association is further identified based on determining that an interaction between the first and second physical objects is predicted to result in damage to at least one object selected from the group consisting of the first object and the second object.

4. The method of claim 1, wherein the properties of the first physical object are obtained from manufacturer-provided information about the first physical object.

5. The method of claim 1, further comprising determining the proximity of the first object to the second object based on at least one selected from the group consisting of: one or more proximity sensors, radio frequency identification, and one or more images of the environment.

6. The method of claim 1, wherein the first physical object is a first electronic device.

7. The method of claim 6, wherein the first physical object is a domestic appliance.

8. The method of claim 6, wherein the second physical object is a second electronic device.

9. The method of claim 1, further comprising receiving from the user, based on the prompting, an approval or denial of the improper association, the approval or denial directing functioning of the first physical object.

10. The method of claim 9, wherein the functioning directed by the user comprises at least one selected from the group consisting of:
 (i) based on the user approving the improper association, initiating commencement of a function of the first physical object; and
 (ii) based on the user rejecting the improper association, at least temporarily blocking one or more functions of the first physical object until the association between the first physical object and second physical object is no longer deemed improper.

11. The method of claim 1, further comprising:
tracking user approvals and rejections of prior-identified improper associations between physical objects;
applying machine learning to the tracked user approvals and rejections to model how the user approves or rejects improper associations; and
modifying at least one rule defining at least one selected from the group consisting of: (i) what constitutes an improper association between subject objects, and (ii) when to notify a user about an improper association between subject objects.

12. The method of claim 1, further comprising providing, for each improper association of one or more improper associations between respective pairs of physical objects in the environment, the one or more improper associations comprising the identified improper association between the first physical object and second physical object, an augmented reality graphical overlay on a display of the mobile device in conjunction with a view, in or through the display, of one or both objects of the pair of physical objects of the improper association.

13. A computer system comprising:
   a memory; and
   a processor in communication with the memory, wherein the computer system is configured to perform a method comprising:
      uniquely identifying, and obtaining properties of, each object of a plurality of physical objects in an environment;
      identifying an improper association between first and second physical objects of the plurality of physical objects in the environment, the improper association being identified based on physical proximity of the first object to the second object and further using obtained properties of the first and second physical objects in identifying compatibility between the first and second physical object and informing that the association between the first and second physical objects is improper; and
      sending to a mobile device of a user an alert indicating the improper association and prompting the user to direct functioning of the first physical object and allay an anticipated consequence of the improper association between the first physical object and the second physical object.

14. The computer system of claim 13, wherein the method further comprises receiving from the user, based on the prompting, an approval or denial of the improper association, the approval or denial directing functioning of the first physical object, wherein the functioning directed by the user comprises at least one selected from the group consisting of:
   (i) based on the user approving the improper association, initiating commencement of a function of the first physical object; and
   (ii) based on the user rejecting the improper association, at least temporarily blocking one or more functions of the first physical object until the association between the first physical object and second physical object is no longer deemed improper.

15. The computer system of claim 13, wherein the method further comprises:
   tracking user approvals and rejections of prior-identified improper associations between physical objects;
   applying machine learning to the tracked user approvals and rejections to model how the user approves or rejects improper associations; and
   modifying at least one rule defining at least one selected from the group consisting of: (i) what constitutes an improper association between subject objects, and (ii) when to notify a user about an improper association between subject objects.

16. The computer system of claim 13, wherein the method further comprises providing, for each improper association of one or more improper associations between respective pairs of physical objects in the environment, the one or more improper associations comprising the identified improper association between the first physical object and second physical object, an augmented reality graphical overlay on a display of the mobile device in conjunction with a view, in or through the display, of one or both objects of the pair of physical objects of the improper association.

17. A computer program product comprising:
   a computer readable storage medium readable by a processing circuit and storing instructions for execution by the processing circuit for performing a method comprising:
      uniquely identifying, and obtaining properties of, each object of a plurality of physical objects in an environment;
      identifying an improper association between first and second physical objects of the plurality of physical objects in the environment, the improper association being identified based on physical proximity of the first object to the second object and further using obtained properties of the first and second physical objects in identifying compatibility between the first and second physical object and informing that the association between the first and second physical objects is improper; and
      sending to a mobile device of a user an alert indicating the improper association and prompting the user to direct functioning of the first physical object and allay an anticipated consequence of the improper association between the first physical object and the second physical object.

18. The computer program product of claim 17, wherein the method further comprises receiving from the user, based on the prompting, an approval or denial of the improper association, the approval or denial directing functioning of the first physical object, wherein the functioning directed by the user comprises at least one selected from the group consisting of:
   (i) based on the user approving the improper association, initiating commencement of a function of the first physical object; and
   (ii) based on the user rejecting the improper association, at least temporarily blocking one or more functions of the first physical object until the association between the first physical object and second physical object is no longer deemed improper.

19. The computer program product of claim 17, wherein the method further comprises:
   tracking user approvals and rejections of prior-identified improper associations between physical objects;
   applying machine learning to the tracked user approvals and rejections to model how the user approves or rejects improper associations; and
   modifying at least one rule defining at least one selected from the group consisting of: (i) what constitutes an improper association between subject objects, and (ii) when to notify a user about an improper association between subject objects.

20. The computer program product of claim 17, wherein the method further comprises providing, for each improper association of one or more improper associations between respective pairs of physical objects in the environment, the one or more improper associations comprising the identified improper association between the first physical object and second physical object, an augmented reality graphical overlay on a display of the mobile device in conjunction with a view, in or through the display, of one or both objects of the pair of physical objects of the improper association.

* * * * *